F. G. SCHEHR.
ROTARY VALVE FOR EXPLOSION ENGINES.
APPLICATION FILED JUNE 10, 1912.
1,078,699.
Patented Nov. 18, 1913.
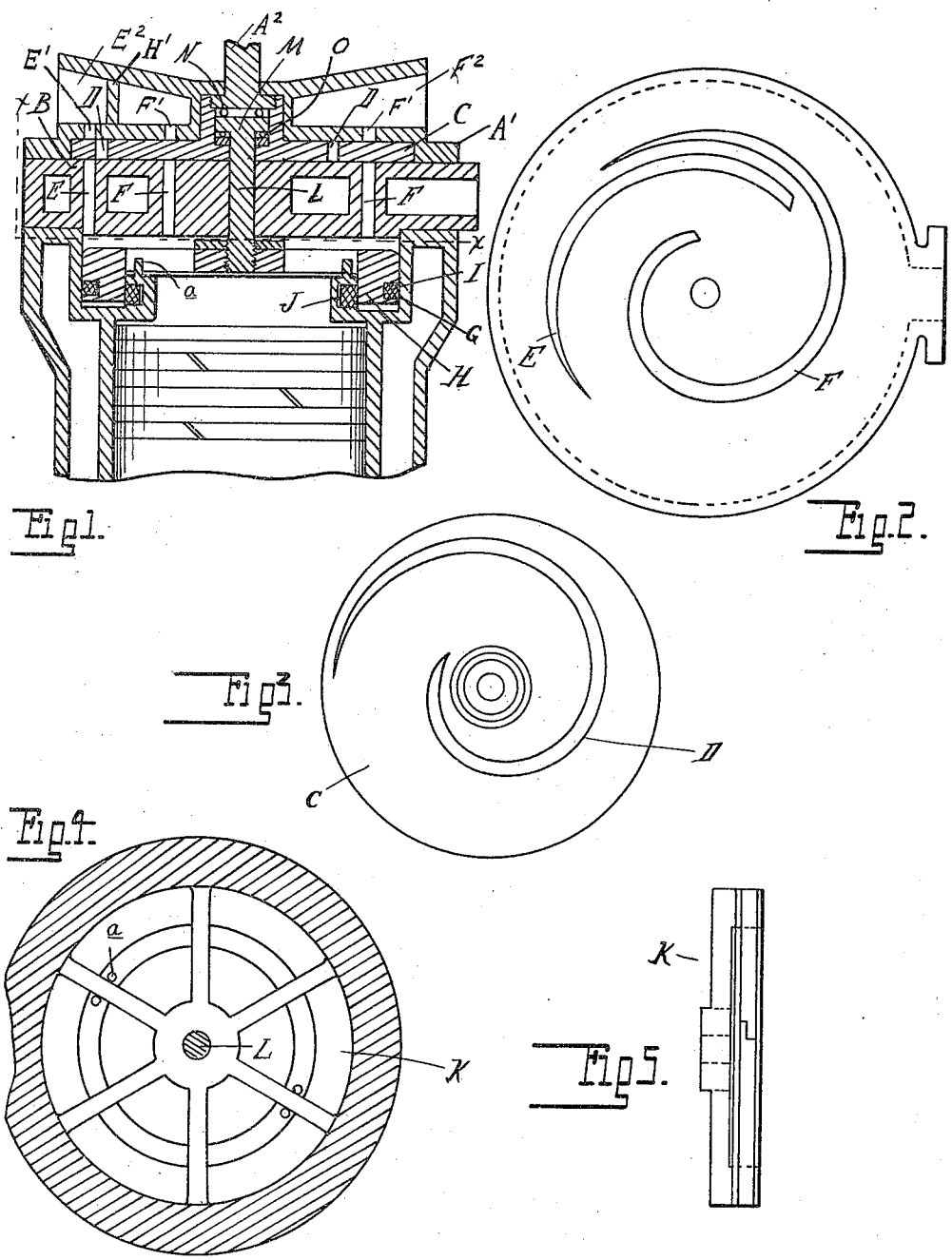
Witnesses
W. K. Ford
James P. Barry
Inventor
Frederick G. Schehr
By Whitman & Whitman
Att'ys
COLUMBIA PLANOGRAPH CO., WASHINGTON, D. C.

UNITED STATES PATENT OFFICE.

FREDERICK G. SCHEHR, OF DETROIT, MICHIGAN.

ROTARY VALVE FOR EXPLOSION-ENGINES.

1,078,699.  Specification of Letters Patent.  Patented Nov. 18, 1913.

Application filed June 10, 1912. Serial No. 702,677.

*To all whom it may concern:*

Be it known that I, FREDERICK G. SCHEHR, a citizen of the United States of America, residing at Detroit, in the county of Wayne and State of Michigan, have invented certain new and useful Improvements in Rotary Valves for Explosion-Engines, of which the following is a specification, reference being had therein to the accompanying drawings.

The invention relates to rotary valves of the ported disk type, and it is the object of the invention first to provide means for balancing the unequal pressure upon the disk by reason of the port therein, and second, to provide a construction in which the port will be quickly opened to its entire area.

With these objects in view the invention consists in various features of construction as hereinafter set forth.

In the drawings: Figure 1 is a longitudinal section through an explosion engine cylinder to which my valve is applied. Fig. 2 is a plan view of the ported head of said cylinder. Fig. 3 is a plan of the valve. Fig. 4 is a horizontal section on the line $x$—$x$ of Fig. 1, showing the valve-balancing member; and Fig. 5 is a side elevation thereof.

A is the cylinder of an engine and B is a ported head for said cylinder; the ports of which are controlled by a rotary disk valve C. This valve is preferably arranged on the outer face of the head, and is provided with a port D therein, which alternately registers with the inlet and exhaust ports E and F through the head B.

A' is a cap for closing the head having suitable ports E' F' therein communicating respectively with the inlet chamber E² and the exhaust chamber F² in the cap. The valve is fixedly secured in any suitable manner to a stem A² which is driven in any well-known way in timed relation to the crank shaft.

During the explosion and compression strokes of the engine the high gaseous pressure developed in the cylinder will act upon the portion of the valve disk which is exposed through the ports in the head B. This will tend to force the valve from its seat, and also, by pressing unequally upon opposite sides of the center of the valve, will tend to tilt the axis of rotation. I have therefore provided means for balancing this pressure, preferably of the following construction: G is an annular recess formed in the upper portion of the cylinder, above the travel of the piston. H is an annular member fitting the recess G and having its outer and inner edges sealed by packing rings I and J. The member H is provided with an inwardly extending center or spider-frame K, which is connected to a stem L passing axially through the head B; the outer end of this stem has the head M thereon which engages a recess N in the valve C and forms an abutment for a thrust bearing O bearing against the bottom of the recess N. The arrangement is such that the ring H, which has an exposed area equal to the port area in the head B, will be subjected to the pressure within the cylinder operating in a direction contrary to that against the valve. As a result the stress will be transmitted through the stem L to the head M, and through the thrust bearing O to the valve, thereby preventing any movement of said valve from its seat. The packing rings I and J prevent leakage of the compressed gases into the recess G so as to eliminate the pressure on the opposite side of the ring H. The spider-frame is held against rotation in any suitable manner, as by pins $a$ projecting upwardly from the wall of the recess G, positioned upon opposite sides of the arms of the frame K.

It is usual in the construction of disk valves to form the ports thereof between radial lines. This requires a considerable angular movement in opening and closing the ports, which interferes with the operation of the engine. I have, therefore, provided an improved construction of port whereby not only may the area of the ports be increased, but also a much quicker opening and closing of the ports is obtained. As shown, the port D is in spiral form and is adapted for registration with spirally formed coöperating ports E and F. By properly selecting the pitch and width of the spiral openings a port having a comparatively large area is obtained and during the rotation of the valve all portions of the port in the valve are simultaneously moved into and out of registration with the ports in the head, thereby effecting a very quick opening and closing of the in-let and exhaust ports.

Preferably the ports E′ F′ are of the same configuration as the ports E F and the chambers E² F² therefor are divided by a somewhat similarly shaped partition H′. However this particular chambering of the cap and the configuration of the ports E′ F′ while desirable, is not necessary since the shape of the ports E F controls the opening of the port D. Any desirable arrangement of ports and chambers in the cap could be employed.

What I claim as my invention is:

1. The combination with a ported seat and a disk valve controlling said ported seat, of an annular member having an area substantially equal to the port area of said seat, exposed to a pressure opposed to that on said valve, an annularly recessed member with which said annular member is engaged to shield the opposite side thereof, and a tie between said annular member and said valve for transmitting the opposed stresses from one to the other.

2. The combination with a ported seat of a disk valve for controlling said ported seat, an annular member having an area substantially equal to the port area of said seat, exposed to gaseous pressure in opposite direction to that upon said valve, a thrust bearing for opposing the movement of said valve from its seat, and a tie between said thrust bearing and said annular member.

3. The combination with an engine cylinder having an annular recess in the upper portion thereof, of an annular member engaging said recess, a ported head for said cylinder, a rotary disk valve seated on the outer face of said ported head, the area of said disk exposed through the ported head being substantially equal to the exposed area of said annular member, and a tie member passing axially through said head and connecting said valve and annular member.

4. The combination with an engine cylinder of a ported head for said cylinder, a rotary disk valve seated upon the outer face of said head, a tie member engaging said valve and passing axially through said head, an annular member, having a spider connection with said tie member, engaging an annular recess in said cylinder and exposing an area substantially equal to the port area of said head, to a pressure opposed to that against said valve whereby the valve is balanced.

5. The combination with a ported seat and a rotary disk valve engaging said seat, of a non-rotating member exposed to a pressure opposed to that against said valve and balancing same.

6. The combination with a ported valve seat, of a rotary disk valve engaging said seat, a non-rotating member exposed to a pressure opposed to that upon said valve through said ported seat, and a tie member passing through said seat axially of said valve, and connecting the latter with said non-rotating member.

7. The combination of an explosion engine cylinder, having an annular recess in the upper portion thereof, of a ported head for said cylinder, a rotary disk valve engaging the outer face of said head, an annular member engaging said annular recess, and having a surface exposed to a pressure opposed to that against said valve through said ported seat, a tie member connected with said annular member and passing through said head in axial alinement with said valve, and a thrust bearing between the outer end of said tie member and said valve.

8. The combination with a valve seat having a spiral port therein, of a rotary disk valve engaging said seat and provided with a corresponding spiral port.

9. The combination of a rotary valve having a spiral port extending upon opposite sides of the axis thereof and a valve seat provided with a corresponding spiral port.

10. The combination with a rotary disk valve having a spiral port extending upon opposite sides of the axis thereof, of a valve seat having a plurality of spiral ports extending upon opposite sides of the axis of the valve, and adapted for successive registration with said valve port in the rotation of the valve.

In testimony whereof I affix my signature in presence of two witnesses.

FREDERICK G. SCHEHR.

Witnesses:
W. J. BELKNAP,
LUCINDA E. SCHEHR.

---

Copies of this patent may be obtained for five cents each, by addressing the "Commissioner of Patents, Washington, D. C."